United States Patent [19]
Strebel

[11] Patent Number: 6,083,434
[45] Date of Patent: Jul. 4, 2000

[54] ROTATIONAL MOLDING PROCESS FOR PRODUCING FOAMED ARTICLES

[75] Inventor: Jeffrey J. Strebel, Cincinnati, Ohio

[73] Assignee: Equistar Chemicals, LP, Houston, Tex.

[21] Appl. No.: 09/262,415

[22] Filed: Mar. 4, 1999

Related U.S. Application Data

[60] Division of application No. 09/114,977, Jul. 14, 1998, Pat. No. 5,922,778, which is a continuation-in-part of application No. 08/842,777, Apr. 17, 1997, Pat. No. 5,783,611
[60] Provisional application No. 60/018,261, May 24, 1996.

[51] Int. Cl.⁷ .................................................. B29C 44/06
[52] U.S. Cl. ............................................. 264/45.7; 264/54
[58] Field of Search ...................... 264/45.7, 54

[56] References Cited

U.S. PATENT DOCUMENTS

| | | |
|---|---|---|
| 2,989,783 | 6/1961 | Stapnik . |
| 3,052,927 | 9/1962 | Hoppe et al. . |
| 3,814,778 | 6/1974 | Hosoda et al. . |
| 3,914,361 | 10/1975 | Shiina et al. . |
| 3,962,390 | 6/1976 | Mori et al. . |
| 3,976,811 | 8/1976 | DeTommasi . |
| 3,984,511 | 10/1976 | Lammers . |
| 4,533,696 | 8/1985 | Schrijver et al. . |
| 4,952,350 | 8/1990 | Duffy . |

FOREIGN PATENT DOCUMENTS

| | | | |
|---|---|---|---|
| 983 226 | 2/1976 | Canada | ................................. 264/45.7 |
| WO 96/15892 | 5/1996 | WIPO . | |

*Primary Examiner*—Allan R. Kuhns
*Attorney, Agent, or Firm*—Gerald A. Baracka; William A. Heidrich

[57] ABSTRACT

Improved compositions useful for the production of rotomolded articles having a foamed interior and non-foamed exterior skin are provided. The compositions of the invention are comprised of a first thermoplastic resin component which is an ethylene polymer in pellet form containing a chemical foaming agent, an organic peroxide and, optionally, a metal-containing activator compound and a second resin component which is a powder and can be a thermoplastic ethylene polymer or ethylene copolymer having less than 30% crystallinity. An improved one-step process for producing foamed rotomolded articles having foamed interiors and non-foamed exterior skins is also provided.

22 Claims, No Drawings

ROTATIONAL MOLDING PROCESS FOR PRODUCING FOAMED ARTICLES

CROSS-REFERENCE TO RELATED APPLICATION

This application is a divisional of application Ser. No. 09/114,977, filed Jul. 14, 1998, now U.S. Pat. No. 5,992,778, which is a continuation-in-part of U.S. application Ser. No. 08/842,777, filed Apr. 17, 1997, now U.S. Pat. No. 5,783,611, which claims the benefit of U.S. Provisional application Ser. No. 60/018,261 filed May 24, 1996.

FIELD OF THE INVENTION

This invention relates to improved compositions useful for producing rotationally molded articles having foamed interiors and non-foamed exterior skins and to the process of producing such articles.

BACKGROUND OF THE INVENTION

Rotational molding, also referred to as rotomolding, is widely used to produce hollow articles such as toys, sporting equipment, water tanks, etc. For the process, a thermoplastic resin is placed in a mold which is then closed, heated and rotated on two axes, i.e., biaxially, to allow the resin to melt and uniformly coat the interior of the mold. The mold is then cooled and the molded article is removed.

In many instances, it is highly desirable to have a foam layer or core in the interior of the molded article to provide insulation, impart structural integrity or stiffness to the article, reduce weight, or the like. This is accomplished by including a foaming or blowing agent with the resin which decomposes at the molding temperature to release a gas, such as $CO_2$ or $N_2$.

The use of foaming agents presents a problem where formed articles having a smooth exterior surface are desired and various techniques have been employed to produce foamed rotomolded goods having a smooth skin layer. In one approach, referred to as the "two-step" method, a non-foamable resin is first introduced into the mold and molded to produce a non-foamed exterior layer of the desired thickness. A foamable resin is then introduced into the mold and the molding operation resumed so that a foamed layer is formed on the inside of the non-foamed layer. Such a method is disclosed in U.S. Pat. No. 3,976,821. While it is possible to produce acceptable molded goods in this manner by proper selection of resin(s) and operating conditions, the procedure is labor intensive and time-consuming. Also, it requires use of a mold with an opening to permit introduction of the foamable resin.

Another approach has been to utilize specially designed equipment, such as disclosed in U.S. Pat. No. 4,952,350, which permits both the non-foamable and foamable resin to be introduced at the beginning of the operation but maintained separately. In this way, the foamable resin can be released, e.g., from a dump box, at some point in the operation after the non-foamable resin has melted and uniformly coated the interior surface of the mold.

In other cases, such as in U.S. Pat. No. 2,989,783, the foamable resin is enclosed in a thermoplastic bag. The foaming or release of gas from the foamable resin forces the bag to expand to the shape of the mold so that the bag forms the outer surface of the article.

Still other approaches have been suggested to produce acceptable rotomolded goods having a smooth skin layer and foamed inner layer in a "one-step" process. These procedures include, for example, processes which rely on density differentials of the foamable and non-foamable resins. However, since density differences of most of the commonly used thermoplastic resins are slight, it is not possible to achieve sharp separation of the foamable and non-foamable layers using this approach.

Another method disclosed in U.S. Pat. No. 3,962,390 relies on the different heat capacities of the foamable and non-foamable resins. By using a resin having a greater heat capacity for the foamable resin, particles of the resin with the lower heat capacity begin to melt first and thereby coat the inner surface of the mold before the resin with the foam agent begins to melt.

While all of the above methods are capable of producing foamed articles with an exterior surface of reasonable quality under optimum processing conditions, with certain resins they are still prone to surface pitting, i.e., the presence of surface pores or pinholes. Surface pores, when sufficiently large and/or present in large numbers can severely detract from the appearance of the molded good and render the article unacceptable. Also, in other instances where the non-foamed skin resin is colored and the foamable interior resin particles is uncolored, surface blotches or blemishes are evident as a result of the interior foamed resin "pushing through" the skin layer. This is particularly true where a thin skin layer is desired and where, as is most usually the case, the foamable resin is in the form of pellets. Obviously, this latter problem could be overcome by coloring the foamable resin but this would increase the cost.

These and other disadvantages associated with heretofore known process are overcome by the composition and process of the present invention whereby it is possible to produce foamed rotomolded articles having an exterior skin which is substantially free of surface defects, such as pitting and color blotches, and a foamed interior.

SUMMARY OF THE INVENTION

In accordance with the present invention, in a first highly useful embodiment there is provided improved compositions useful for the production of rotomolded articles having foamed interiors and non-foamed exteriors comprising: (a) 25 to 75 percent by weight, based on the weight of the total composition, ethylene polymer pellets ranging in size from 1/16 inch to 3/16 inch in diameter and containing 0.25 to 7.5 weight percent chemical foaming agent, based on the weight of the ethylene polymer, said ethylene polymer having a melt index from 0.25 up to 25, and (b) 75 to 25 percent by weight, based on the weight of the total composition, ethylene polymer powder mixture containing: (i) a major proportion of fractional melt index ethylene polymer powder wherein 80 percent or more of the powder particles are greater than 250 microns in size and (ii) a minor proportion of ethylene polymer powder wherein 80 percent or more of the, powder particles are less than 250 microns in size and the ethylene polymer has a melt index greater than 1 g/10 mins. The mean particle size of the two powder components, i.e. (b)(i) and (b)(ii) differ by at least 100 microns. The powder mixture most commonly consists of 75 to 97.5 percent (b)(i) preferably having a particle size from 250 to 1000 microns and 2.5 to 25 percent (b)(ii) preferably having a particle size from 10 to 250 microns. Azdocarbonamides and modified azodicarbonamnides are the preferred foaming agents. Particularly useful results are obtained when (a) is high density polyethylene, (b)(i) is low density polyethylene and (b)(ii) is linear low density polyethylene.

In another useful embodiment of the invention up to 2.5 weight percent organic peroxide and, optionally, up to 4 weight percent metal-containing activator compound, are included with the chemical foaming agent in the ethylene polymer pellets. The inclusion of an organic peroxide with the foaming agent enables the processor to reduce the density of the foam and thereby reduce the overall weight of the molded article and decrease the cycle time. This also broadens the processing window by increasing the thermal stability of the foam.

In yet another highly useful embodiment, flexible foamed rotomolded articles are produced using compositions wherein one or more ethylene polymers having rubber-like characteristics; such as ethylene-vinyl acetate copolymers, ethylene-alkyl acrylate copolymers and ethylene-α-olefin copolymers, are employed. For these formulations, the chemical foaming agent may constitute up to 20 weight percent of the pellet component along with up to 2.5 weight percent organic peroxide and up to 4 weight percent metal-containing activator compound. The powder component may also be comprised, in whole or in part, of a rubbery ethylene copolymer. Compositions which utilize foamable LDPE pellets and EVA copolymer powders are particularly useful for this embodiment.

An improved process for utilizing said compositions wherein said polymer pellets containing the chemical foaming agent and optional organic peroxide and activator and said polymer powders are combined and heated in a mold at a temperature above the melt temperature of the polymers and above the decomposition temperature of the foaming agent while biaxially rotating the mold to produce foamed molded articles having surfaces which are substantially free of surface defects, such as pinholes and color blotches, and a foamed interior is also provided.

DETAILED DESCRIPTION OF THE INVENTION

The present invention relates to foamable polyolefin resin compositions and to foamed rotomolded articles produced therefrom having a non-foamed exterior skin. The articles may be hollow or the interior can be completely foam filled. The hollow articles may be flexible or have a rigid or semi-rigid structure depending on the resins employed, the relative thickness of the foamed and non-foamed layers, and the amount of chemical foaming agent and optional additives used.

The compositions of the invention are comprised of two distinct thermoplastic resin components, namely, a first component which is an ethylene polymer in pellet form containing the chemical foaming agent and any additional additives, such as peroxide and activator, and a second powder component which is a mixture of different particle size and melt index ethylene polymer powders.

Depending on the particular application involved, i.e., the rotomolded articles being produced, the weight ratio of pellet to powder may be varied within wide limits. In general, however, the first resin component, also referred to herein as the foamable resin or pelletized resin, constitutes from 25 to 75 weight percent of the total composition and the second powder resin component constitutes from 75 to 25 weight percent of the total composition. More preferably for certain applications, the pelletized resin is present in an amount from 30 to 60 weight percent and the resin powder is present in an amount from 70 to 40 weight percent.

While any of the well-known polyolefin rotomolding resins can be used for the compositions of the invention, polyethylene resins are most generally employed to obtain the first (pellet) component and second (powder) component. As used herein the term "polyethylene" encompasses both homopolymers of ethylene and copolymers of ethylene with $C_{3-8}$ α-olefins, vinyl $C_{2-4}$ carboxylates, $C_{1-4}$ alkyl (meth)acrylates, typically having ethylene as the predominant monomer. Commonly used polyethylenes include very low density polyethylene (VLDPE), low density polyethylene (LDPE), linear low density polyethylene (LLDPE), medium density of polyethylene (MDPE), high density polyethylene (HDPE) and very high density or ultra high molecular weight polyethylenes, produced using well-known Ziegler. Phillips or metallocene polymerization catalysts and procedures.

Ethylene-vinyl carboxylate and ethylene-alkyl (meth) acrylate copolymers can also be utilized for the compositions of the invention and are also encompassed by the term "polyethylene" as used herein. These ethylene copolymers can have a rubber-like characteristic and are particularly advantageous for the production of flexible foamed rotomolded articles. As employed herein the terms "rubbery" and "rubber-like" refer to polymers that can be stretched at room temperature to at least twice their original length and after having been stretched and the stress removed, return to approximately their original length in a relatively short period of time. Such polymers will typically have less than about 30% crystallinity and, more commonly, less than 20% crystallinity as determined by measuring the area of the crystalline melt peak by differential scanning calorimetry (DSC) in accordance with known procedures.

Useful rubbery ethylene copolymers include ethylene-vinyl acetate copolymers, ethylene-alkyl acrylate copolymers and ethylene-α-olefin copolymers. Particularly useful ethylene-vinyl acetate copolymers will generally contain from 8 to 50% vinyl acetate and more preferably, 10 to 45% vinyl acetate. The ethylene-alkyl acrylate copolymers will generally have from 1 to 50% and, more preferably, 5 to 50% alkyl acrylate, such as ethyl acrylate or n-butyl acrylate, copolymerized with the ethylene. Ethylene-α-olefin copolymers can contain from about 70 to 80% α-olefin having from about 3 to 8 carbon atoms, most preferably, propylene, butene-1, hexene-1 and mixtures thereof. When the alpha-olefin is propylene, it will typically be present in an amount from about 20 to 80% whereas the higher alpha-olefins are generally employed in amounts from 7 to 40%. The foamable portion of the rotomolding composition, i.e., first component, is comprised of a pelletized ethylene polymer having a melt index from 0.25 g/10 mins. up to about 25 g/10 mins. which contains the chemical foaming agent and, optionally, other additives such as peroxide, foam activators and the like. The pellets range in size from about 1/16 inch to about 3/16 inch in diameter. In one useful embodiment, the ethylene polymer has a melt index from 1 to 10 g/10 mins. The chemical foaming or blowing agent will comprise up to 20% weight percent, based on the weight of the ethylene polymer and, most commonly, will range from 0.25 to 20 weight percent. For certain applications where the compositions are to be used to produce rigid foamed articles, the foaming agent will be present from 0.25 to 7.5 and, more preferably, from 0.5 to 5 weight percent. With formulations where organic peroxide is used and particularly where flexible foamed articles are to be produced, the foaming agent will generally be employed in an amount from about 2.5 up to about 18 weight percent and, more preferably, from about to 10 weight percent.

It is particularly advantageous, when rotomolding rigid foamed articles, if the ethylene polymer is a high density polyethylene. HDPEs have densities in the range 0.941 $g/cm^3$ to 0.970 $g/cm^3$ and impart stiffness to the foamed interior layer or core of the rotomolded article. Also, HDPE has a higher melt temperature than lower density ethylene polymers which is desirable for optimal results in these applications. Useful HDPE polymers include homopolymers of densities 0.960–0.970 g/cm$^3$ and copolymers, usually with butene-1 or hexene-1, of densities 0.941–0.959 g/cm$^3$.

Densities reported herein for the ethylene polymers are determined in accordance with ASTM D-1505. Melt indexes referred to herein are determined in accordance with ASTM D-1238-57T at 2160 grams load and 190° C. Melt indexes are reported in g/10 mins.

Conventional chemical foaming agents are employed with the ethylene polymer and are incorporated utilizing known procedures. Typically, the polyethylene, chemical foaming agent and any optional ingredients are mixed in an extruder at a temperature above the melt temperature of the resin but below the decomposition temperature of the chemical blowing agent and organic peroxide if used. The melt is then passed through suitable die, such as used with a pelletizer, to obtain the pelletized resin.

The foaming agents can be any of the known organic or inorganic compounds or systems which decompose at elevated temperatures to release a gas such as $N_2$ or $CO_2$. Organic foaming agents, sometimes also referred to as blowing agents, include azodicarbonamide (ADCA) and modified azodicarbonamide, i.e., ADCA modified with zinc oxide, calcium carbonate or the like to lower the decomposition temperature and activate the system, 5-phenyltetrazole, dinitrosopentamethylene tetramine, azobisisobutyronitrile, diazoaminobenzene, oxybis (benzenesulfonylhydrazide) and the like. Inorganic foaming agents can include sodium borohydride, ammonium carbonate, sodium bicarbonate and modified sodium bicarbonate, i.e., sodium bicarbonate modified with a proton donor such as citric acid, and the like. ADCA, modified ADCA, sodium bicarbonate and sodium bicarbonate/citric acid foaming agents are most commonly used for the compositions and process of this invention. ADCA and modified/activataed ADCA are particularly useful in compositions which contain an organic peroxide.

While it is not necessary, additives which function to control or modify foam cell size or foam density or modify/ control the temperature or rate of decomposition of the chemical blowing agent may also be included with the ethylene polymer. Useful additives of this type, generally referred to herein as metal-containing activators, include calcium carbonate, titanium dioxide, zinc oxide, zinc stearate, calcium stearate, dibasic lead phthalate, dibasic lead stearate, chromium in the form of trivalent or hexavalent cations, and the like. When present, the amount of these activators can range up to about 4 percent by weight, based on the weight of the ethylene polymer. Most typically, the amount of activator used is between 0.01 and 2.5 weight percent.

To achieve the desired improvements with the composition and process of the invention, a second component referred to herein as the non-foamable component or powder component is necessarily used with the pelletized resin component containing the foaming agent described above. The ethylene polymer(s) used for the powder component will be the same as used to prepare the first (pelletized) component containing the foaming agent or they can be different. In one embodiment of the invention particularly useful for producing rigid rotomolded goods having a tough exterior skin, a powder mixture comprised of two distinct ethylene polymer powders is employed. The two powders used for the second component may be derived from the same type of ethylene polymer provided that the ethylene polymer powders have different particle sizes and different melt indexes. The principal or primary powder component which comprises the major portion, i.e., greater than 50 percent, of the powder mixture is an ethylene polymer powder wherein 80 percent or more of the powder particles are 250 microns in size and wherein the ethylene polymer has a fractional melt index. As used herein, the term "fractional" melt index refers to melt indexes less than 1 g/10 mins The minor powder component which constitutes less than 50 percent of the powder mixture is an ethylene polymer powder wherein 80 percent or more of the powder particles are less than 250 microns in size and wherein the ethylene polymer has a melt index greater than 1 g/10 mins. The mean particle size of the two powder components should differ by at least 100 microns. More typically, the mean particle size of the powder components which comprise the mixture will differ by 150 microns or more.

The particle size of the major powder component most generally ranges from 250 to 1000 microns and, more preferably, these powder particles range from 250 to 600 microns in size. The particle size of the minor powder component most generally ranges from 10 to 250 microns and, more preferably, these powder particles range from 20 to 225 microns in size. It will be understood for the above particle size ranges, as well as for other particle size ranges referred to herein, that 80 percent or more of the particles will fall within the specified size limits. Particle sizes are determined using standard screening, i.e., sieving procedures.

The larger particle size powder component most generally constitutes from about 75 to about 97.5 percent of the total powder mixture with the smaller particle size powder constituting from 2.5 to 25 weight percent. More preferably, the larger particle size polymer comprise 85 to 95 weight percent of the powder mixture with the smaller particle size polymer comprising the balance.

In one highly useful embodiment of this invention the ethylene polymer comprising the major powder component and from which the larger size powder particles are derived has a melt index from 0.1 to 0.8 g/10 mins. and, more preferably, from 0.2 to 0.5 g/10 mins and is LDPE having a density from 0.915 to 0.930 g/cm$^3$. The ethylene polymer which comprises the minor powder component and from which the smaller particle size powder particles are formed preferably has a melt index from 1 to 10 g/10 mins. and, most preferably, from 2 to 7 g/10 mins and is LLDPE having a density from 0.915 to 0.940 g/cm$^3$. LLDPEs are conventionally obtained by polymerizing ethylene with butene-1, hexene-1 or octene-1. LDPEs are conventionally obtained by the high pressure homopolymerization of ethylene and characterized by having long chain branches which are formed during the polymerization.

It is, however, also possible to utilize low density copolymers of ethylene with monomers which contain polar groups, such as vinyl acetate, ethyl acrylate, n-butyl acrylate or the like, as all or a portion of the powder component. Utilizing copolymers of the latter type which have rubbery characteristics makes it possible to produce flexible foamed rotomolded articles. When utilizing a rubbery copolymer for the powder component, it may be present by itself or used with any of the aforementioned ethylene polymers useful for this purpose. When rotomolding flexible foam-filled products, if more than one resin is used for the powder component, it is not essential that the different resin powders be of different particle size or particle size distribution.

In addition to the organic peroxide and metal-containing activator compound which can be included in the foamable ethylene polymer resin component, other additives may also be present in small amounts with either the foamable and/or non-foamable components. Such additives may include pigments and colorants, UV stabilizers, antioxidants, anti-static agents and the like. Typically, when present, these additives are used in amounts less than 1 percent and, more commonly, less than 0.5 percent by weight, based on the resin.

It is particularly useful when the foamable resin component is the highest melting resin in the composition. In this way, the non-foamable resin powders which form the exterior surface melt before the pellets containing the foaming agent and can uniformly coat the interior of the mold before significant foaming occurs. The resins employed for the non-foamable powder mixture may have different melt temperatures but it is not essential for the success of the process, since other factors such as particle size and the molding conditions also play a role.

In one embodiment, where foamed rigid rotomolded articles having superior surface quality are produced, without the use of organic peroxides, all of the resins employed have different peak melt temperatures (determined by differential scanning calorimetry). Preferably, the foamable resin is HDPE and the non-foamable powder is a mixture of 75 to 97.5 percent LDPE and 2.5 to 25 percent LLDPE. By utilizing these resins, and when all of the other specified criteria are met, it is possible to produce foamed articles having a smooth exterior appearance and which are substantially free of surface pores or pinholes. As used herein, the terms "essentially free" or "substantially free" indicate that while some pitting may be apparent on close examination, these pinholes or surface pores are of a nature and number so as not to render the surface of the molded article unacceptable, i.e., the overall appearance is not objectionable to the observer when viewed with the naked eye. Magnification of the surface may reveal some surface porosity, however, any surface pores present are sufficiently small in number and size that they do not detract from the surface appearance. Additionally, when using a non-foamable resin powder which is colored, the skin layer of the rotomolded article is uniformly colored and free of color blotches. Color blotches, or "measling" as it is also known, caused by uncolored foamable resin pellets "pushing through" the skin layer during the rotation is virtually eliminated with the compositions and process of this invention.

In another useful embodiment, where compositions capable of being rotomolded into articles which are substantially lighter in weight, an organic peroxide is combined with the ethylene polymer and foaming agent to produce the foamable pellet component of the composition. It is even more advantageous when a metal-containing activator is included in the pellet component. Utilizing this approach it is not only possible to significantly reduce the foam density thereby reducing the weight of rotomolded goods produced therewith, and reduce cycle times By reducing the length of time required to produce a particular rotomolded article, i.e., the cycle time, the professor can realize significant cost benefits. By utilizing these compositions, it is also possible to broaden the processing window. Broadening the processing window gives the processor greater operational latitude which results in fewer articles which need to be scrapped. By including a peroxide and activator with the foaming agent, foam densities have been reduced by as much as 60% over identical formulations except for the absence of peroxide. Similarly, cycle times have been reduced by as much as 43% and the processing window increased by as much as 300%. All of this was accomplished with no sacrifice in the structural or aesthetic qualities of the rotomolded piece.

To achieve these improvements, up to 2.5 weight percent and, more preferably, from 0.1 to 2.0 weight percent organic peroxide is used. It is even more advantageous for certain formulations to employ 0.25 to 1.5 weight percent organic peroxide. Any of the known organic peroxides with sufficiently high activation temperatures which will enable them to be processed with the foaming agent and olefin polymer to form the foamable pellet component without significant decomposition can be used. By way of example these include: dicumyl peroxide, bis(t-butylperoxyisopropyl) benzene; di-t-butyl peroxide; t-butylcumyl peroxide; 2,5-dimethyl-2,5-di(t-butylperoxy)hexyne-3; 2,5-dimethyl-2,5-di(t-butylperoxy)hexane, and the like. The organic peroxides may be used as such or absorbed onto particulate materials, such as $CaCO_3$, clays, polyolefin resins and the like. When they are absorbed, the weight percentage ranges specified above do not include the particulate carrier and are especially useful organic peroxides used either neat or absorbed on $CaCO_3$. It is particularly effective when using a foaming agent/peroxide combination to include a metal-containing activator at a level up to about 4 weight percent and, more preferably, form 0.01 to 2.5 weight percent, based on the weight of the olefin polymer.

In yet another highly useful embodiment of the invention, when utilizing ethylene copolymer(s) having rubbery characteristics and including an organic peroxide and metal-containing activator in the foamable component, flexible foamed rotomolded articles can be produced. By judicious selection of the ethylene copolymer used in either or both the foamable and nonfoamable components and the types and amounts of foaming agent, peroxide and activator and by varying the rotomolding conditions, it is possible to produce a wide variety of flexible foamed products. For example, the texture, thickness and flexural elasticity of the skin can be varied to satisfy the requirements of diverse applications. In a similar manner the foam density, compressive modulus and yield stress can be varied within broad limits.

Utilizing the compositions of the inventions comprised of a foamable pellet component and a nonfoamable powder component, it is possible to produce both rigid and flexible foamed rotomolded parts in a one-step operation. The process eliminates the need of introducing the foamable and non-foamable resins into the mold in two steps and also overcomes problems associated with heretofore known one-step processes. In the present invention, the resin pellets containing the foaming agent and the non-foamable resin powder are both charged to the mold at the outset of the rotomolding operation. The pellets and powder may be added separately or they may be combined and the mixture charged to the mold prior to commencement of the rotomolding operation. After the pellets and powder are introduced, the mold is closed and the rotomolding cycle can be conducted without interruption.

For the molding process, the mold is rotated biaxially, i.e., in two directions, utilizing conventional rotomolding equipment. No special equipment is required to carry out the process. The powder and pellets are moved throughout the mold and contact the interior surfaces which enables the resins to melt and uniformly coat the interior of the mold. Interior surfaces of the mold may be treated with a suitable mold release agent, however, this is optional. The mold is rotated at a speed which permits the resin to contact the inner walls of the mold by action of gravity. Centrifugal forces are nonexistent or minimal. Typically, heating is accomplished by placing the mold in an oven. The temperature must be sufficient to melt the resins and activate the foaming agent and will generally range between about 200 to 350° C. The speed of rotation of the mold in the two directions can also be varied between wide limits. Generally, the rate of rotation will be between about 1 and about 25 rpm. In one embodiment of the invention it has been found to be particularly advantageous to operate at a higher rotation rate than is generally used in commercial practice. Whereas, ratios of 4:1 (outer axis:inner axis) are commonly employed for commercial rotomolding, operations, with the compositions of this invention exceptional results have been observed when the outer axis rotation rate is from 12 to 25 rpm and the inner axis rotation rate is 7 to 20 rpm.

The temperature used for the rotomolding operation will depend on various factors including the size of the mold, mold geometry, thickness of the part being rotomolded, the foaming agent used and the resins employed. Similarly, the length of time required to rotomold the article will depend on these factors and the temperature. As a result, time and temperature will vary within wide limits. For example, to mold a tank having a part thickness of approximately 0.5 inch using one of the a preferred compositions of the invention wherein the foamable resin is HDPE and the non-foamable powder is a mixture of LDPE and LLDPE, a temperature in the range of about 225° C. to 300° C. is preferred for a time of 20 to 50 minutes.

These and other features of the invention are illustrated in more detail in the examples which follow. All parts and percentages in the examples are on a weight basis unless otherwise indicated.

EXAMPLE 1

A rotomolding composition comprising 40 percent foamable resin pellets and 60 percent non-foamable resin powder was prepared in accordance with the invention. The foamable resin was HDPE (MI 5.5; density 0.961) containing 0.6 percent azodicarbonamide obtained by pre-compounding the HDPE and foaming agent in an extruder and pelletizing. The non-foamable resin powder was a mixture of 90 percent LDPE (MI 0.25; density 0.918) and 10 percent LLDPE (MI 3.5; density 0.939) powders of different particle size obtained by grinding. Particle size distributions of the two powders (determined by shaking a known amount of powder through a stack of screens of different mesh size and measuring the amount of material retained) were as follows:

|  | LDPE Powder | LLDPE Powder |
| --- | --- | --- |
| >590 microns | 0% | 0% |
| 500–590 microns | 8.6% | 0% |
| 420–449 microns | 44.3% | 0% |
| 250–419 microns | 29.4% | 1.8% |
| 180–249 microns | 9.7% | 44.9% |
| 150–179 microns | 3.6% | 19.1% |
| <150 microns | 4.4% | 34.2% |
| Mean Particle Size | 370 | 185 |

To facilitate visual examination and comparison of rotomolded parts produced from the rotomolding composition, 1.5 percent inorganic red pigment (DC-22552 RED from Teknor Color Company) was melt blended with the LLDPE resin before grinding.

Approximately 7½ pounds of the powder/pellet mixture was introduced into an aluminum tank mold measuring 13×20×3 inches vented with a Teflon® tube containing a steel wool plug. The rotomolding operation was carried out using a single arm shuttle rotomolding machine and the following conditions:

Temperature 250° C.

Time 45 minutes

Rotation Rate:
  Outer Axis 19 rpm
  Inner Axis 15 rpm

Cooling Cycle:
  10 minutes air (with fan)
  10 minutes water spray
  10 minutes air (with fan)

The rotomolded tank had good rigidity and mechanical strength. The exterior skin was smooth and substantially free of surface pitting. Furthermore, the skin layer was uniformly colored with no indication of the uncolored interior foam layer pushing through the surface layer. Sectioning the tank revealed a sharp boundary between the foam and skin layers and uniform thickness of the layers throughout the entire part. Furthermore, the foam layer had uniform cell structure with a smooth, continuous interior surface.

COMPARISON A

To demonstrate the necessity of using a mixture of powders, when Example 1 is repeated except that the non-foamable resin powder is comprised solely of either (a) 100 percent of the fractional melt index LDPE powder or (b) 100 percent of the 3.5 MI LLDPE powder, it is not possible to produce articles having good layer distinction and a non-pitted exterior surface. In the first case (a), where the higher MI, smaller particle size LLDPE powder is omitted, the skin layer of the tank is heavily pitted and unacceptable. In the second case (b), where the fractional melt index, larger particle size LDPE powder is omitted, the surface is smooth but "measled," i.e., uncolored or lightly colored blotches are evident on the surface as a result of uncolored foaming resin mixing with the colored skin layer.

COMPARISON B

To demonstrate the need for the major, larger particle size powder component to have a fractional melt index, Example 1 was repeated except that different LDPE resins were employed in the makeup of the powder mixture. In the first instance, the LDPE was a 2.1 MI, 0.922 density resin and in the second instance, the LDPE had an MI of 3.7 and density of 0.923. The powder particle size distribution was essentially the same as for the fractional melt index LDPE of Example 1. While rotomolded tanks produced using the two comparative resins were smooth and essentially free of pitting, numerous light colored areas or blotches where the uncolored foamed resin mixed with the colored skin layer were apparent. In the case of the 2.1 MI LDPE, there were 0.15 blemishes per square inch of surface whereas 0.21 blemishes per square inch were recorded with the 3.7 MI LDPE. Furthermore, the thickness of the foam layer was not uniform in either case and, with the 3.7 MI resin, there was incomplete foam coverage.

EXAMPLE 2

To further illustrate the invention and the ability to rotomold foam-filled parts having a smooth, uniformly colored, pit-free exterior skin, a composition comprised of 50 percent pellets and 50 percent powder was prepared and evaluated. For this experiment the HDPE pellets contained 1 5 percent azodicarbonamide and the HDPE had an MI of 4.0 and density of 0.946. The powder was the same LDPE/LLDPE mixture as used for Example 1. Rotomolding was conducted as previously described except that the venting system was modified and the cooling cycle was as follows:

20 minutes air
20 minutes air (with fan)
10 minutes water spray
10 minutes air (with fan)

A molded tank produced using the above-described composition had a smooth skin layer and the interior was completely foamed. The surface was substantially free of pinholes and no color variation was observed.

EXAMPLE 3

To further demonstrate the need for the smaller particle size powder component and the effect of particle size, a series of rotomolding compositions were prepared containing 50 percent HDPE pellets and 50 percent of a mixture of LDPE and LLDPE powders. The HDPE component had an MI of 8 and density of 0.963 and the pellets contained 0.6 percent azodicarbonamide. The LDPE (MI 0.25; density 0.922) powder used for all the products had essentially the same particle size distribution as in Example 1; however, the LLDPE (MI 3.5; density 0.939) particle size distribution was varied. Details of the compositions and particle size distributions of the various LLDPE powders used are set forth in the table which follows. Compositions 3(a) and 3(b) are products of the invention whereas compositions C, D, E and F are provided for comparative purposes.

Each composition was used to rotomold a foamed hexagonal article and the surface porosity evaluated. For the rotomolding operation, 2.4 lbs of the composition was charged to a steel hexagonal mold measuring 12 inches across and 5 inches deep. The mold was heated at 350° C. for 25 minutes while rotating at a rate of 9 rpm (inner axis) and 16 rpm (outer axis). The cooling cycle consisted of 10 minutes water spray and 10 minutes air cooling with a fan. The number of surface pores or pinholes in a 1.2 cm×1 cm area was measured using the Global Lab Image Analysis "Particle" Tool/Function. The image was generated by a camera attached to a stereomicroscope (15× magnification). The measurement area was held constant by maintaining the scanning region borders at their outer limits. Two areas at the approximate same location on each of the articles were examined and the number of surface pores determined by averaging eight readings (four readings in each area). Results are reported in the table. The data clearly show the significant and unexpected reduction in the number of pinholes with the compositions of the invention when the minor powder component has a particle size less than 250 microns. As the particle size of the minor (LLDPE) component in the powder mixture is increased, there is a marked increase in the number of surface pits on the rotomolded part.

| PRODUCT | 3(a) | 3(b) | C | D | E | F |
|---|---|---|---|---|---|---|
| Powder Composition: | | | | | | |
| % LDPE | 90 | 85 | 90 | 85 | 90 | 85 |
| % LLDPE | 10 | 15 | 10 | 15 | 10 | 15 |
| LLDPE Particle Size (microns) | <250 | <250 | 250–297 | 250–297 | 420–590 | 420–590 |
| Average no. of surface pits | 10 | 6 | 121 | 67 | 188 | 176 |

EXAMPLE 4

Example 3(a) was repeated except that a LDPE (MI 1.8; density 0.923) containing 0.6 percent azodicarbonamide was employed as the foamable resin. Rotomolded hexagonal articles produced therefrom had a smooth, uniformly colored skin layer.

EXAMPLE 5

Repeating Example 4 but substituting a fractional melt index HDPE powder for the LDPE powder also save foamed rotomolded articles with exterior skins which were smooth and substantially tree of surface pitting.

EXAMPLE 6

To demonstrate the ability to include additives in the foamable resin, a rotomolding composition was prepared by combining the following:

| | |
|---|---|
| 3.80 parts | HDPE pellets (MI 4.3, density 0.953) containing 0.5 wt. % zinc oxide and 1.8 wt. % azodicarbonamide |
| 0.41 parts | LLDPE powder of Example 1 |
| 3.97 parts | LDPE powder of Example 1 |

The above composition was used to rotomold a tank using the same mold, resin charge, temperature and rotation rate employed for Example 1. Tanks of comparable quality were produced using shorter cycle times which results in significant cost benefits. By the addition of ZnO to the foamable resin pellets, it was possible to reduce the cycle time by approximately 15 percent without sacrificing foam or surface qualities of the rotomolded part.

EXAMPLE 7

Foamable pellets containing 2 wt. % azodicarbonamide were prepared utilizing an HDPE resin having a MI of 4 and density of 0.946. These pellets were combined with the LDPE/LLDPE powder mixture of Example 1 at a ratio of 48:52 (pellet:powder) and the compositions rotomolded at 316° C. Tanks of good quality, i.e., having good rigidity and surface appearance with a uniformly foamed interior, were obtained. The oven time required to rotomold the tanks. i.e, cycle time, was 20 minutes. The foam had a density of approximately 8 lbs./ft.$^3$

EXAMPLE 8

To demonstrate the ability to reduce the cycle time by incorporating a metal-containing activator, Example 7 was repeated except 0.2 wt. % zinc oxide was compounded into the foamable HDPE pellets along with the azodicarbonamide. By including the activator, the time required to produce rotomolded tanks was reduced to approximately 18 minutes without compromising the quality of the tanks. Foam density was approximately 8 lbs/ft.$^3$

EXAMPLE 9

The ability to alter the foam characteristics, specifically, to reduce the foam density, by further varying the compositions of the invention is illustrated by this example. For this experiment, rigid foamed articles were rotomolded utilizing foamable LDPE pellets. The LDPE had a MI of 7 and density of 0.918 and was compounded with 2% azodicarbonamide, 2% zinc oxide and 0.5% LUPERCO XL (45–48% 2,5-dimethyl-2,5-di(t-butylperoxy)hexyne-3) The pellets were combined with the LDPE/LLDPE powder mixture at a ratio of 48:52 (pellet:powder) and the resulting compositions charged to the tank mold In and rotomolded at 316° C. to produce rigid, foam-filled tanks. The cycle time was 18 minutes. Tanks of comparable surface quality to those produced in Examples 7 and 8 and having a uniform, line cell size foamed interior; however, the foam density was advantageously lowered to approximately 7 lbs/ft$^3$. Foams produced in this manner have compressive modulii (ASTM C 165) in the range of 160–550 psi. In addition to the desirable reduction in the weight of the article produced using the foamable composition containing the organic peroxide, there was a significant broadening of the processing window. The processing window is the difference between the maximum and minimum oven times in which an acceptable part can be produced. Under the conditions employed, the formulation of this example had a processing window of 4 minutes, i.e., acceptable rotomold parts could be obtained using cycle times from 18 to 22 minutes; whereas the compositions of Examples 6 and 7 had processing windows of 1 minute (21–20 minutes) and 2 minutes (20–18 minutes), respectively.

EXAMPLES 10 AND 11

To demonstrate the ability to reduce the foam density to an even greater extent and further improve, i.e, reduce, cycle times, two experiments were conducted following the procedure of Example 9 utilizing LDPE pellets containing a foaming agent, metal-containing activator and organic peroxide. The foamable pellets were comprised as follows:

Example 10: 93.5% LDPE
5.0% azodicarbonamide
0.5% zinc oxide
1.0% LUPERCO XL
Example 11: 93.5% LDPE
5.0% azodicarbonamide
0.5% zinc oxide
5% LUPERCO XL These pellets were combined at the same ratio with the LDPE/LLDPE powder and rotomolded at 316° C. to produce semi-rigid tanks having smooth surfaces substantially free of surface pitting. Compared to the rotomolding operation of Example 9, foam densities were reduced by approximately 40% and cycle times reduced by approximately 10%. For example, the foam produced using the composition of Example 10 had a density of approximately 4 lbs/ft.$^3$ and the cycle time was 16 minutes.

EXAMPLE 12

Flexible foam-filled, light weight articles having a rubbery copolymer skin were produced using a composition of 1.5 parts ethylene-vinyl acetate (19% VA) copolymer powder (35 mesh) and 0.75 part foamable pellets comprised of 87.5% LDPE, 10% azodicarbonamide, 1% zinc oxide and 1.5% LUPERCO XL. The composition was rotomolded at approximately 255° C. using a hexagonal mold as described in Example 3. Cycle time used was 15 minutes. The foam had a density of approximately 2 lbs./ft.$^3$ and compressive modulus less than 100 psi. This procedure can also be utilized to produce articles having a more rigid skin covering a soft foam by substituting LDPE or a mixture of LDPE/LLDPE, such as used in Example 1, for all or a portion of the EVA in the above-identified powder component.

EXAMPLE 13

The versatility of the present invention and the ability to produce even lighter weight flexible, foam-filled articles is illustrated by this example wherein, following the procedure of Example 12, LDPE pellets and EVA powder were combined and rotomolded in a hexagonal mold. The EVA powder was the same as utilized in Example 12, however, the foamable pellets comprised 82% LDPE, 15% azodicarbonamide, 1.5% zinc oxide and 1.5% LUPERCO XL. Rotomolded articles produced utilizing this formulation had a foam density of approximately 1.5 lbs/ft.$^3$ and compressive modulus of approximately 8 psi. Among the many uses of flexible, foam-filled articles of this type include use as cushioning devices and the like. Even softer foamed articles can be produced by reducing or even completely replacing the LDPE in the foamable pellets with a copolymer having more rubbery characteristics.

EXAMPLE 14

This example further demonstrates the ability to reduce cycle times. The experiment was carried out utilizing an LDPE/LLDPE powder mixture with LLDPE pellets containing 3.5% oxybis(benzenesulfonylhydrazide) and 0.5% LUPERCO XL. The LLDPE utilized for the preparation of the foamable pellets had a melt index of 3.5 and density of 0.939. When the compositions were rotomolded at 293° C. using Teflon hexagonal tank molds, cycle times of approximately 12 minutes were achieved and the resulting foamed tanks had good surface quality and rigidity. Under the same molding conditions, the composition of Example 8 required a cycle time of 30 minutes. The foam had a density of approximately 8–9 lbs/ft.$^3$. Foam densities of the compositions can be reduced by utilizing a higher melt index, e.g., 6 MI, LLDPE resin.

I claim:

1. A process for rotationally molding articles having a foamed interior and a non-foamed exterior skin which comprises introducing a rotomolding composition comprising polymers to a mold and heating the mold and its contents to a temperature above the melt temperature of the polymers and above decomposition temperatures of a chemical foaming agent and an organic peroxide while biaxially rotating, said rotomolding composition comprising:

(a) 25 to 75 wt. %, based on the weight of the total composition, ethylene polymer pellets ranging in size from about 1/16 inch to about 3/16 inch in diameter and containing 0.25 to 7.5 wt. % chemical foaming agent, based on the weight of the ethylene polymer and 0.1 to 2.0 wt. % organic peroxide, based on the weight of the ethylene polymer, said ethylene polymer having a melt index from 0.25 g/10 mins to 25 g/10 mins; and (b) 75 to 25 wt. %, based on the weight of the total composition, ethylene polymer powder containing:

(i) a major proportion of fractional melt index ethylene polymer powder wherein 80 percent or more of the powder particles are greater than 250 microns in size and (ii) a minor proportion of ethylene polymer powder wherein 80 percent or more of the powder particles are less than 250 microns in size and the ethylene polymer has a melt index greater than 1 g/10 mins., and with the proviso that the mean particle size of (b)(i) and (b)(ii) differ by at least 100 microns.

2. The process of claim 1 wherein (a) of the rotomolding composition comprises from 30 to 60 weight percent of the total composition and (b) comprises 40 to 70 weight percent of the total composition.

3. The process of claim 2 wherein the foaming agent of the rotomolding composition is selected from the group consisting of azodicarbonamide, modified azodicarbonamide, oxybis(benzenesulfonylhydrazide), sodium bicarbonate and sodium bicarbonate/citric acid and the organic peroxide is selected from the group consisting of dicumyl peroxide, bis(t-butylperoxyisopropyl)benzene, di-t-butyl peroxide, t-butylcumyl peroxide, 2,5-dimethyl-2,5-di(t-butylperoxy)hexyne-3 and 2,5-dimethyl-2,5-di(t-butylperoxy)hexane.

4. The process of claim 3 wherein (a) of the rotomolding composition also contains up to 4 weight percent metal-containing activator, based on the weight of the ethylene polymer, selected from the group consisting of zinc oxide or zinc stearate.

5. The process of claim 4 wherein the foaming agent of the rotomolding composition is azodicarbonamide, modified azodicarbonamide or oxybis(benzenesulfonyl-hydrazide) present in an amount from 0.5 to 5 wt. %, based on the weight of the ethylene polymer.

6. The process of claim 5 wherein (a) of the rotomolding composition is a high density ethylene homopolymer or copolymer of ethylene and $C_{3-8}$ α-olefin having a melt index from 1 to 10 g/10 mins and density from 0.941 to 0.970 g/cm$^3$.

7. The process of claim 6 wherein (a) of the rotomolding composition is a copolymer of ethylene and butene-1 or hexene-1 having a density of 0.941 to 0.959 g/cm$^3$.

8. The process of claim 5 wherein (b)(i) of the rotomolding composition constitutes from 75 to 97.5 percent of the total powder mixture and (b)(ii) constitutes from 2.5 to 25 percent of the total powder mixture.

9. The process of claim 8 wherein (b)(i) of the rotomolding composition has a particle size of from 250 to 1000 microns and is a low density ethylene homopolymer having a melt index from 0.1 to 0.8 g/10 mins and density from 0.915 to 0.930 g/cm$^3$.

10. The process of claim 7 wherein (b)(ii) of the rotomolding composition has a particle size from 10 to 250 microns and is a low density copolymer of ethylene with butene-1, hexene-1 or octene-1 having a melt index from 1 to 10 g/10 mins.

11. The process of claim 10 wherein (b)(ii) of the rotomolding composition is a linear LDPE having a particle size from 20 microns to 225 microns, density from 0.915 to 0.940 g/cm$^3$, and melt index from 2 to 7 g/10 mins.

12. The process of claim 7 wherein the organic peroxide of the rotomolding composition is 2,5-dimethyl-2,5-di(t-butylperoxy) hexyne-3 or 2,5-dimethyl-2,5-di(t-butylperoxy) hexane present in an amount form 0.25 to 1.5 wt. %, based on the weight of the ethylene polymer and optionally adsorbed onto calcium carbonate or clay.

13. A process for rotationally molding flexible foamed-filled articles which comprises introducing a rotomolding composition comprising polymers to a mold and heating the mold and its contents to a temperature above the melt temperature of the polymers and above decomposition temperatures of a chemical foaming agent and an organic peroxide while biaxially rotating, said rotomolding compositions comprising:

(a) 25 to 75 wt. %, based on the weight of the total composition, ethylene polymer pellets ranging in size form 1/16 inch to about 3/16 inch in diameter and containing 0.25 to 20 wt. % chemical foaming agent, based on the weight of the ethylene polymer, 0.1 to 2.5 wt. % organic peroxide, based on the weight of the ethylene polymer, and 0.1 to 4 wt. % metal-containing activator, based on the weight of the ethylene polymer; said ethylene polymer having a melt index from 0.25 g/10 mins to 25 g/10 mins, and (b) 75 to 25 wt. %, based on the weight of the total composition, of an ethylene copolymer powder wherein the ethylene copolymer has less than 30% crystallinity as determined by differential scanning calorimetry and is selected from the group consisting of ethylene-vinyl acetate copolymers, ethylene-alkyl acrylate copolymers and ethylene-α-olefin copolymers.

14. The process of claim 13 wherein the foaming agent of the rotomolding composition is selected from the group consisting of azodicarbonamide, modified azodicarbonamide, oxybis(benzenesulfonylhydrazide), sodium bicarbonate and sodium bicarbonate/citric acid and the organic peroxide is selected from the group consisting of dicumyl peroxide, bis(t-butylperoxyisopropyl)benzene, di-t-butyl peroxide, t-butylcumyl peroxide, 2,5-dimethyl-2,5-di(t-butylperoxy)hexyne-3 and 2,5-dimethyl-2,5-di(t-butylperoxy)hexane.

15. The process of claim 14 wherein the ethylene copolymer (b) is an ethylene-vinyl acetate copolymer containing from 8 to 50% vinyl acetate, an ethylene-alkyl acrylate copolymer containing 1 to 50% ethyl acrylate or n-butyl acrylate and an ethylene-α-olefin copolymer containing 20 to 80% of an α-olefin having from 3 to 8 carbon atoms.

16. The process of claim 15 wherein (a) of the rotomolding composition comprises from 30 to 60 wt. % of the total composition and (b) comprises from 40 to 70 wt. % of the total composition.

17. The process of claim 16 wherein the ethylene polymer is LDPE.

18. The process of claim 17 wherein the ethylene copolymer has less than 20% crystallinity as determined by differential scanning calorimetry.

19. The process of claim 17 wherein the metal-containing activator of the rotomolding composition is zinc oxide or zinc stearate present in an amount from 0.01 to 2.5 wt. %, based on the weight of the ethylene polymer.

20. The process of claim 17 wherein the organic peroxide of the rotomolding composition is 2,5-dimethyl-2,5-di(t-butylperoxy) hexyne-3 or 2,5-dimethyl-2,5-di(t-butylperoxy) hexane present in an amount form 0.25 to 1.5 wt. %, based on the weight of the ethylene polymer.

21. The process of claim 17 wherein the foaming agent of the rotomolding composition is azodicarbonamide, modified azodicarbonamide or oxybis(benzenesulfonyl-hydrazide) present in an amount from 0.5 to 5 wt. %, based on thee weight of the ethylene polymer.

22. The process of claim 17 wherein the ethylene copolymer of the rotomolding composition is an ethylene-vinyl acetate copolymer containing from 10 to 45% vinyl acetate.

* * * * *